(12) United States Patent
Chen (10) Patent No.: US 11,876,466 B2
(45) Date of Patent: Jan. 16, 2024

(54) MOTOR CONTROLLING CIRCUIT

(71) Applicant: ANPEC ELECTRONICS CORPORATION, Hsinchu (TW)

(72) Inventor: Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 32 days.

(21) Appl. No.: 17/505,637

(22) Filed: Oct. 20, 2021

(65) Prior Publication Data

US 2023/0022386 A1 Jan. 26, 2023

(30) Foreign Application Priority Data

Jul. 21, 2021 (TW) ................................. 110126719

(51) Int. Cl.
*H02P 6/16* (2016.01)
*H02P 25/024* (2016.01)
*H02P 23/00* (2016.01)

(52) U.S. Cl.
CPC ........ *H02P 25/024* (2016.02); *H02P 23/0086* (2013.01)

(58) Field of Classification Search
CPC ....... H02P 25/024; H02P 23/0086; H02P 6/16
See application file for complete search history.

(56) References Cited

U.S. PATENT DOCUMENTS

| 2002/0060544 A1* | 5/2002 | Teutsch | H02P 6/085 |
| | | | 318/599 |
| 2009/0140677 A1* | 6/2009 | Imai | H02P 6/16 |
| | | | 361/679.48 |
| 2011/0031918 A1* | 2/2011 | Sugie | H02P 7/04 |
| | | | 318/400.29 |
| 2015/0194892 A1* | 7/2015 | Kudo | H02M 3/158 |
| | | | 323/271 |
| 2017/0317625 A1* | 11/2017 | Vera | H02P 29/02 |
| 2018/0183364 A1* | 6/2018 | Lee | H02P 29/027 |

* cited by examiner

*Primary Examiner* — Cortez M Cook
(74) *Attorney, Agent, or Firm* — Li & Cai Intellectual Property Office (57) ABSTRACT

A motor controlling circuit is provided. A first terminal of a first high-side transistor and a first terminal of a second high-side transistor are coupled to a common voltage. A first terminal of a first low-side transistor is connected to a second terminal of the first high-side transistor. A first node between the first terminal of the first low-side transistor and the second terminal of the first high-side transistor is connected to a first terminal of a motor. A first terminal of a second low-side transistor is connected to a second terminal of the second high-side transistor. A second node between the first terminal of the second low-side transistor and the second terminal of the second high-side transistor is connected to a second terminal of the motor. The driver circuit regulates at least one of the transistors such that no current flows to the common voltage.

5 Claims, 12 Drawing Sheets

MOTOR CONTROLLING CIRCUIT

CROSS-REFERENCE TO RELATED PATENT APPLICATION

This application claims the benefit of priority to Taiwan Patent Application No. 110126719, filed on Jul. 21, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor controlling circuit.

BACKGROUND OF THE DISCLOSURE

Circuit components of electronic products produce heat during operation, by which air circulated throughout an enclosed space, especially in an enclosed chassis of a server, is heated up. As a result, other circuit components are damaged due to overheating. Therefore, fans must be disposed in the electronic products and used to cool down the circuit components of the electronic products.

However, when a controller circuit controls transistors of a motor driver circuit to drive a single phase motor of the fan to rotate such that blades of the fan rotate, a reverse current recharges a common voltage coupled to the single phase motor so that the common voltage exceeds a voltage that the transistors of the motor driver circuit can withstand. Therefore, the transistors of the motor driver circuit are damaged.

SUMMARY OF THE DISCLOSURE

In response to the above-referenced technical inadequacies, the present disclosure provides a motor controlling circuit, which is applicable to a motor. The motor controlling circuit includes a bridge circuit, a driver circuit, a controller circuit and a feedback circuit. The bridge circuit includes a plurality of transistors. The plurality of transistors includes a first high-side transistor, a first low-side transistor, a second high-side transistor, and a second low-side transistor. A first terminal of the first high-side transistor is coupled to a common voltage. A first terminal of the first low-side transistor is connected to a second terminal of the first high-side transistor. A second terminal of the first low-side transistor is grounded. A first node between the first terminal of the first low-side transistor and the second terminal of the first high-side transistor is connected to a first terminal of the motor. A first terminal of the second high-side transistor is coupled to the common voltage. A first terminal of the second low-side transistor is connected to a second terminal of the second high-side transistor. A second terminal of the second low-side transistor is grounded. A second node between the first terminal of the second low-side transistor and the second terminal of the second high-side transistor is connected to a second terminal of the motor. The driver circuit is connected to a control terminal of each of the plurality of transistors. The driver circuit is configured to turn on or off each of the plurality of transistors. The controller circuit is connected to the driver circuit and configured to control the driver circuit. The feedback circuit is connected to the driver circuit, the controller circuit, the first node and the second node. The feedback circuit is configured to receive a voltage of the first node or a voltage of the second node. The feedback circuit is configured to output a feedback signal to the driver circuit. The driver circuit, according to the feedback signal, regulates the bridge circuit to adjust the voltage of the first node or the voltage of the second node such that a current of the motor does not flow to the common voltage after the bridge circuit is switched.

In certain embodiments, the driver circuit, according to a control signal from the controller circuit and the feedback signal, turns off the first high-side transistor and the second high-side transistor, fully or slightly turns on the first low-side transistor, and fully or slightly turns on the second low-side transistor, at a same time, such that the current flows through the first low-side transistor and the second low-side transistor.

In certain embodiments, the driver circuit, according to a control signal from the controller circuit and the feedback signal, turns off the first low-side transistor and the second low-side transistor, fully or slightly turns on the first high-side transistor, and fully or slightly turns on the second high-side transistor, at a same time, such that the current flows through the first high-side transistor and the second high-side transistor.

In certain embodiments, the driver circuit, according to a control signal from the controller circuit and the feedback signal, regulates the bridge circuit to adjust the voltage of the second node to approach or be equal to the common voltage and to adjust the voltage of the first node to approach or be equal to a zero value, or regulates the bridge circuit to adjust the voltage of the first node to approach or be equal to the common voltage and to adjust the voltage of the second node to approach or be equal to the zero value.

In certain embodiments, the feedback circuit receives a signal from the first node or the second node. The feedback circuit determines whether or not the current approaches a zero value according to the signal from the first node or the second node.

In certain embodiments, the feedback circuit includes an operational amplifier. A first input terminal of the operational amplifier is connected to the second node. A second input terminal of the operational amplifier is coupled to the common voltage or a reference voltage. An output terminal of the operational amplifier is connected to the control terminal of the second low-side transistor.

In certain embodiments, the feedback circuit further includes a first voltage divider circuit. The first voltage divider circuit includes a first resistor and a second resistor. A first terminal of the first resistor is coupled to the common voltage. A second terminal of the first resistor is connected to a first terminal of the second resistor. A second terminal of the second resistor is grounded. The first input terminal of the operational amplifier is connected to the second node. The second input terminal of the operational amplifier is connected to a node between the second terminal of the first resistor and the first terminal of the second resistor.

In certain embodiments, the feedback circuit further includes a second voltage divider circuit. The second voltage divider circuit includes a third resistor and a fourth resistor. A first terminal of the third resistor is connected to the second node. A second terminal of the third resistor is connected to a first terminal of the fourth resistor. A second terminal of the fourth resistor is grounded. The first input terminal of the operational amplifier is connected to a node between the second terminal of the third resistor and the first terminal of the fourth resistor.

In certain embodiments, the feedback circuit includes an operational amplifier. A first input terminal of the operational amplifier is connected to the first node. A second input terminal of the operational amplifier is coupled to the common voltage or a reference voltage. An output terminal of the operational amplifier is connected to the control terminal of the first low-side transistor.

In certain embodiments, the feedback circuit includes an operational amplifier. A first input terminal of the operational amplifier is grounded. A second input terminal of the operational amplifier is connected to the first node. An output terminal of the operational amplifier is connected to the control terminal of the first high-side transistor.

In certain embodiments, the controller circuit outputs an enable signal to the feedback circuit to enable the feedback circuit such that the feedback circuit is always turned on or only turned on for a period of time before the bridge circuit is switched.

In certain embodiments, the motor controlling circuit further includes a rotor position detector circuit. The rotor position detector circuit is connected to the controller circuit. The rotor position detector circuit is configured to detect a position of a rotor of the motor. The controller circuit controls the driver circuit based on the position of the rotor of the motor.

As described above, the present disclosure provides the motor controlling circuit. Before the bridge circuit is switched, the first high-side transistor and the second high-side transistor are turned off, the first low-side transistor is fully or slightly turned on, and the second low-side transistor is fully or slightly turned on. Under this condition, the voltage of the first node between the first terminal of the first low-side transistor and the second terminal of the first high-side transistor can be regulated to a first target voltage. Alternatively, the voltage of the second node between the first terminal of the second low-side transistor and the second terminal of the second high-side transistor can be regulated to a second target voltage. As a result, the current flows to ground through the first low-side transistor and the second low-side transistor. Then, when the bridge circuit is switched, no current flows to or charges the common voltage to reach an excessive voltage. Therefore, the transistors can be prevented from being damaged by the excessive voltage.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
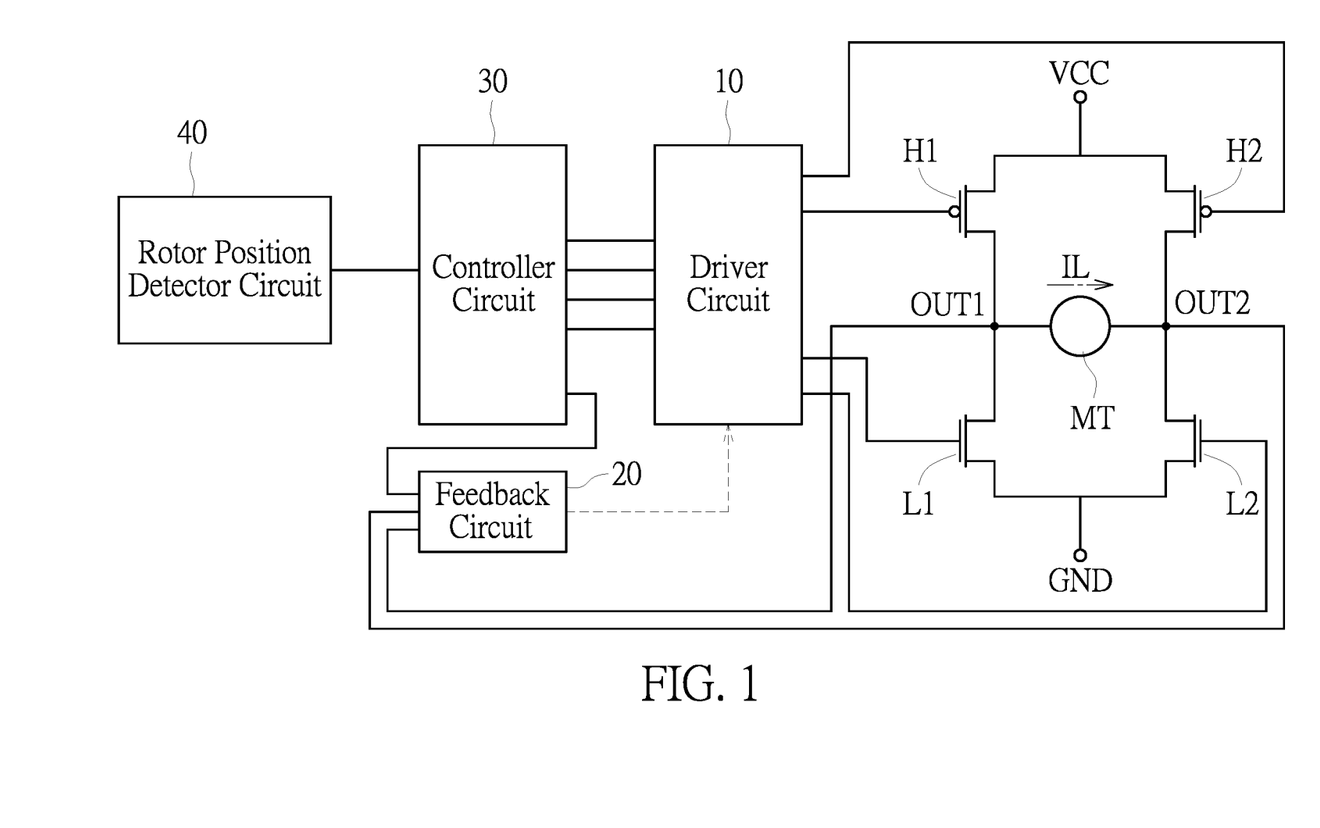
FIG. 1 is a block diagram of a motor controlling circuit according to first to eighth embodiments of the present disclosure.

Reference is made to FIG. 1, which is a block diagram of a motor controlling circuit according to first to eighth embodiments of the present disclosure.

In the embodiment, the motor controlling circuit can include a bridge circuit, a driver circuit 10, a feedback circuit 20, a controller circuit 30 and a rotor position detector circuit 40, which are applicable to a motor MT, as shown in FIG. 1. The bridge circuit may include a plurality of transistors such as a first high-side transistor H1, a first low-side transistor L1, a second high-side transistor H2 and a second low-side transistor L2 as shown in FIG. 1.

A first terminal of the first high-side transistor H1 may be coupled to a common voltage VCC. A second terminal of the first high-side transistor H1 may be connected to a first terminal of the first low-side transistor L1. A first node OUT1 between the first terminal of the first low-side transistor L1 and the second terminal of the first high-side transistor H1 may be connected to a first terminal of the motor MT. A second terminal of the first low-side transistor L1 may be connected to ground GND.

A first terminal of the second high-side transistor H2 may be coupled to the common voltage VCC. A second terminal of the second high-side transistor H2 may be connected to a first terminal of the second low-side transistor L2. A second node OUT2 between the first terminal of the second low-side transistor L2 and the second terminal of the second high-side transistor H2 may be connected to a second terminal of the motor MT. A second terminal of the second low-side transistor L2 may be connected to the ground GND.

The driver circuit 10 may be connected to a control terminal of the first high-side transistor H1, a control terminal of the first low-side transistor L1, a control terminal of the second high-side transistor H2, and a control terminal of the second low-side transistor L2. The driver circuit 10 may output a plurality of driving signals respectively to a plurality of transistors to turn on or off each of the transistors such as the first high-side transistor H1, the first low-side transistor L1, the second high-side transistor H2 and the second low-side transistor L2 as shown in FIG. 1.

The rotor position detector circuit 40 may be disposed on the motor MT. The rotor position detector circuit 40 may detect a position of a rotor of the motor MT. The rotor position detector circuit 40 may be connected to the driver circuit 10 and the rotor position detector circuit 40. The controller circuit 30 may output a plurality of controlling signals to the driver circuit 10 based on the position of the rotor of the motor MT. The driver circuit 10 may output the plurality of driving signals respectively to the control terminals of the plurality of transistors to turn on or off each of the transistors, respectively according to the plurality of controlling signals.

The controller circuit 30 may be connected to the feedback circuit 20. Before the controller circuit 30 controls the driver circuit 10 to switch the bridge circuit (such that the motor MT commutates), the controller circuit 30 may output an enable signal to the feedback circuit 20 to enable the feedback circuit 20 to operate. For example, the feedback circuit 20 is always turned on, or is only turned on for a period of time before the bridge circuit is switched, but the present disclosure is not limited thereto. An operating time of the feedback circuit 20 may be adjusted according to actual requirements and the above-mentioned operations related to the enable signal may be omitted in practice.

It is worth noting that, the feedback circuit 20 may be connected to the first node OUT1, the second node OUT2 and the driver circuit 10. The feedback circuit 20 may receive a voltage of the first node OUT1 and a voltage of the second node OUT2. The feedback circuit 20 may output a feedback signal (when the feedback circuit 20 is triggered by the enable signal from the controller circuit 30).

Before the driver circuit 10 switches the bridge circuit, the driver circuit 10 may, according to the feedback signal, regulate one or more of the first high-side transistor H1, the first low-side transistor L1, the second high-side transistor H2 and the second low-side transistor L2 of the bridge circuit. As a result, the voltage of the first node OUT1 or the voltage of the second node OUT2 is adjusted such that the current flows to the ground GND. Therefore, after the driver circuit 10 switches the bridge circuit, the current does not flow to the common voltage VCC and thus the common voltage VCC is not charged to be higher than a voltage threshold by the current, thereby preventing the bridge circuit from being damaged by an excessive common voltage.

For example, the driver circuit 10 may, according to the feedback signal, turn off the first high-side transistor H1 and the second high-side transistor H2 of the bridge circuit, fully or slightly turn on the first low-side transistor L1 of the bridge circuit, and fully or slightly turn on the second low-side transistor L2 of the bridge circuit, at a same time. Under this condition, the current sequentially flows through the first low-side transistor L1 and the second low-side transistor L2 to the ground GND, or sequentially flows through the second low-side transistor L2 and the first low-side transistor L1 to the ground GND.

The driver circuit 10 may, according to the feedback signal and a control signal from the controller circuit 30, regulate the bridge circuit to adjust the voltage of the second node OUT2 to approach or be equal to the common voltage VCC and to adjust the voltage of the second node OUT1 to approach or be equal to a zero value, but the present disclosure is not limited thereto. In practice, the driver circuit 10 may regulate the bridge circuit to adjust the voltage of the second node OUT1 to approach or be equal to the common voltage VCC and to adjust the voltage of the second node OUT2 to approach or be equal to the zero voltage. Alternatively, the driver circuit 10 may regulate the bridge circuit to adjust the voltage of the second node OUT1 or the voltage of the second node OUT2 such that a ratio of the voltage of the second node OUT1 or the voltage of the second node OUT2 to the common voltage VCC is equal to a preset ratio.

Figure 2:
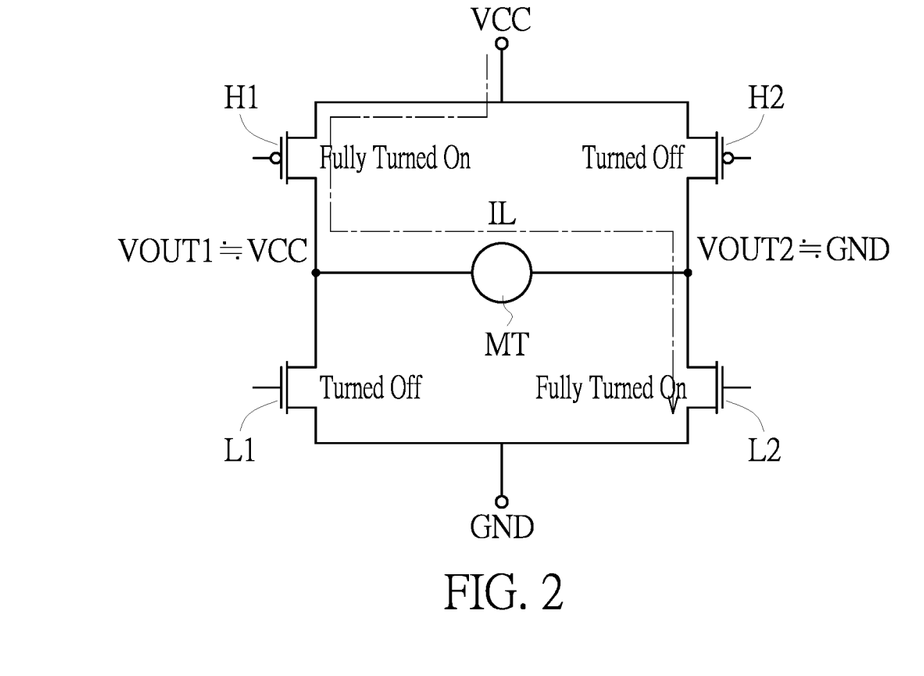
FIG. 2 is a circuit layout diagram of a bridge circuit of the motor controlling circuit and a motor according to the first embodiment of the present disclosure.
Figure 3:
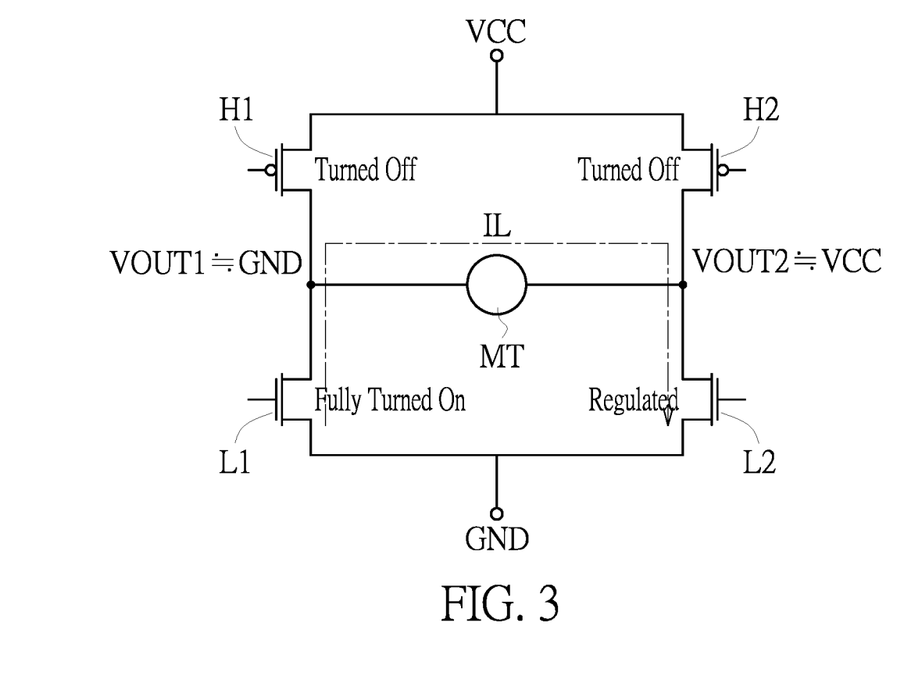
FIG. 3 is a circuit layout diagram of the bridge circuit of the motor controlling circuit and a motor according to the first embodiment of the present disclosure.
Figure 4:
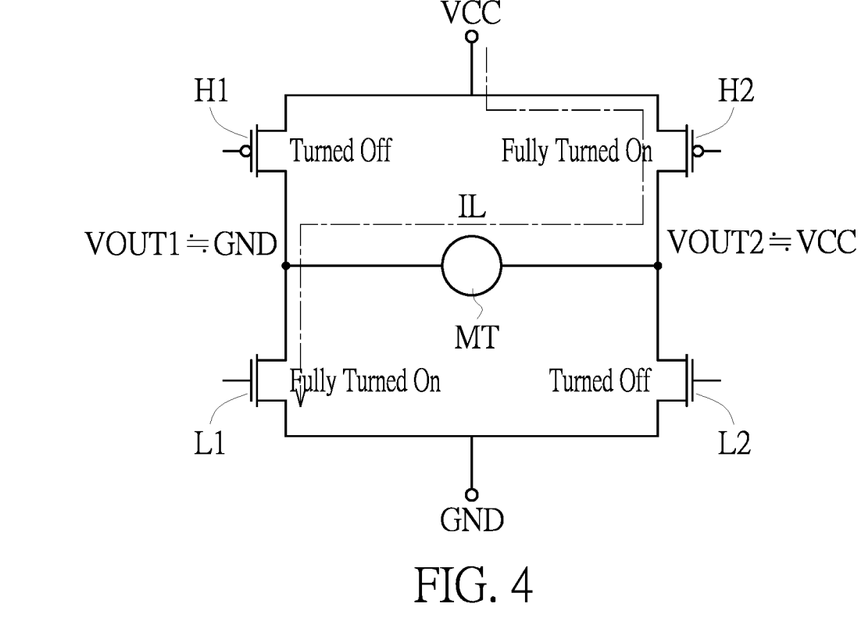
FIG. 4 is a circuit layout diagram of the bridge circuit of the motor controlling circuit and the motor according to the first embodiment of the present disclosure.

Reference is made to FIGS. 1 to 4, in which FIG. 2 is a circuit layout diagram of a bridge circuit of the motor controlling circuit and a motor according to the first embodiment of the present disclosure, FIG. 3 is a circuit layout diagram of the bridge circuit of the motor controlling circuit and a motor according to the first embodiment of the present disclosure, and FIG. 4 is a circuit layout diagram of the bridge circuit of the motor controlling circuit and the motor according to the first embodiment of the present disclosure. The same descriptions are not repeated herein.

As shown in FIG. 2, the first high-side transistor H1 and the second low-side transistor L2 of the bridge circuit may be fully turned on, and the first low-side transistor L1 and the second high-side transistor H2 of the bridge circuit may be turned off, at a same time, by the driver circuit 10 shown in FIG. 1. At this time, a voltage VOUT1 of the first node OUT1 between the first terminal of the first low-side transistor L1 and the second terminal of the first high-side transistor H1 may approach or be equal to the common voltage VCC. In addition, a voltage VOUT2 of the second node OUT2 between the first terminal of the second low-side transistor L2 and the second terminal of the second high-side transistor H2 may approach or be equal to the zero voltage. A current IL flows from the common voltage VCC sequentially through the first high-side transistor H1 and the second low-side transistor L2 to the ground GND.

As shown in FIG. 4, the driver circuit 10 fully turns on the first low-side transistor L1 and the second high-side transistor H2, and turns off the first high-side transistor H1 and the second low-side transistor L2.

The driver circuit 10 may switch the first high-side transistor H1 and the second low-side transistor L2 of the bridge circuit from a fully turned-on state shown in FIG. 2 to a turned-off state shown in FIG. 4. In addition, the driver circuit 10 may switch the first low-side transistor L1 and the second high-side transistor H2 from a turned-off state shown in FIG. 2 to a fully turned-on state shown in FIG. 4. After the driver circuit 10 switches the bridge circuit, a residual current may still flow through the bridge circuit while not having flowed to the ground GND yet. As a result, the current IL including the residual current flows to the common voltage VCC (sequentially through the first low-side transistor L1 and the second high-side transistor H2) and charges the common voltage VCC.

Therefore, it is worth noting that, in the embodiment, before the driver circuit 10 switches the bridge circuit from a state shown in FIG. 2 to the state shown in FIG. 4, the driver circuit 10 switches the bridge circuit as shown in FIG. 3. That is, before the bridge circuit is switched from the state shown in FIG. 2 to the state shown in FIG. 4, a protection operation of FIG. 3 is performed. It should be understood that, in practice, the driver circuit 10 may switch the bridge circuit from the state shown in FIG. 4 to the state shown in FIG. 2. Before the bridge circuit is switched from the state shown in FIG. 4 to the state shown in FIG. 2, a protection operation that is the same as or similar to the protection operation of FIG. 3 may be performed.

As shown in FIG. 3, the driver circuit 10 turns off the first high-side transistor H1 and the second high-side transistor H2, thereby preventing the current IL from flowing through the first high-side transistor H1 or the second high-side transistor H2 to the common voltage VCC. At a same time, the driver circuit 10 fully turns on the first low-side transistor L1, and regulates and slightly turns on the second low-side transistor L2. As a result, the current IL flows through the first low-side transistor L1, then slowly flows through the second low-side transistor L2, and finally flows to the ground GND.

In practice, the driver circuit 10 may fully turn on the second low-side transistor L2, and regulates and slightly turns on the first low-side transistor L1, at a same time. As a result, the current slowly flows through the first low-side transistor L1, then flows through the second low-side transistor L2, and finally flows to the ground GND.

More precisely, the feedback circuit 20 may receive the current flowing through the motor MT and the bridge circuit. When the feedback circuit 20 determines that the current is larger than a threshold, the feedback circuit 20 outputs the feedback signal and the driver circuit 10 regulates the bridge circuit according to the feedback signal. The driver circuit 10 does not switch the bridge circuit from a state shown in FIG. 3 to the state shown in FIG. 4 until the current flowing through the motor MT and the bridge circuit is smaller than the threshold.

Figure 5:
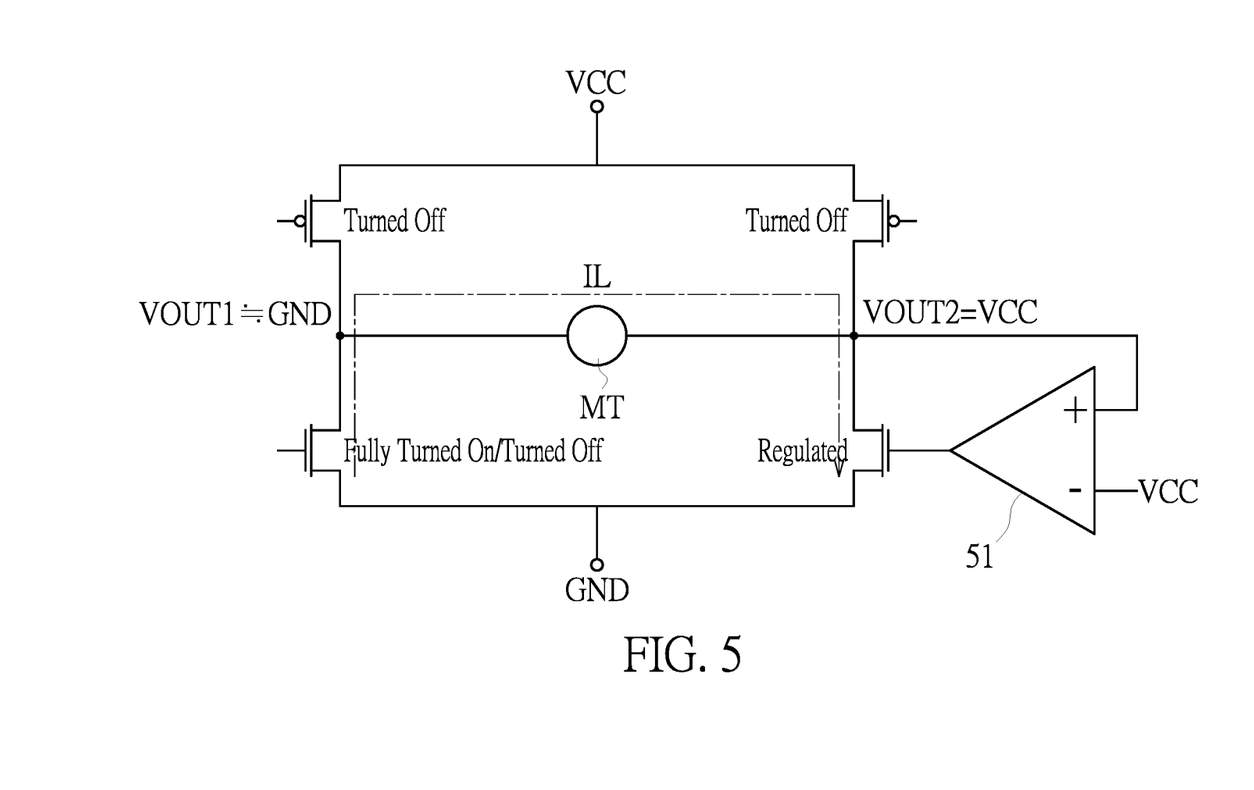
FIG. 5 is a circuit layout diagram of a bridge circuit and a feedback circuit of the motor controlling circuit and a motor according to the second embodiment of the present disclosure.

Reference is made to FIGS. 1 to 5, in which FIG. 5 is a circuit layout diagram of a bridge circuit and a feedback circuit of the motor controlling circuit and a motor according to the second embodiment of the present disclosure. The same descriptions are not repeated herein.

The feedback circuit 20 shown in FIG. 1 may include an operational amplifier 51 shown in FIG. 5. A first input terminal such as a non-inverting input terminal of the operational amplifier 51 may be connected to the second node OUT2. A second input terminal such as an inverting input terminal of the operational amplifier 51 may be coupled to the common voltage VCC (or a reference voltage). An output terminal of the operational amplifier 51 may be connected to the control terminal of the second low-side transistor L2.

The second input terminal of the operational amplifier 51 receives the common voltage VCC such that a voltage of the first input terminal of the operational amplifier 51 that is the voltage VOUT2 of the second node OUT2 is pulled up to a voltage that is equal to the common voltage VCC (from the zero voltage).

Figure 6:
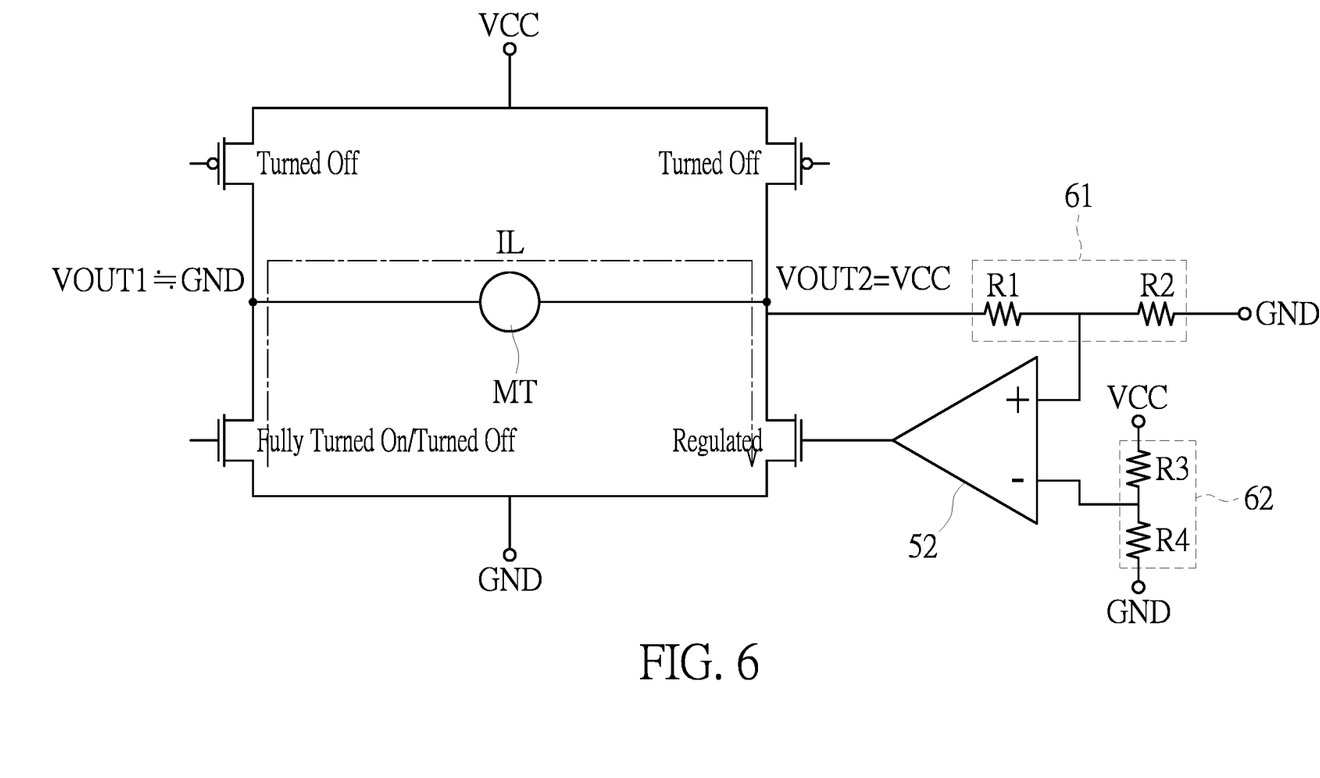
FIG. 6 is a circuit layout diagram of a bridge circuit and a feedback circuit of the motor controlling circuit and a motor according to the third embodiment of the present disclosure.

Reference is made to FIGS. 1 and 6, in which FIG. 6 is a circuit layout diagram of a bridge circuit and a feedback circuit of the motor controlling circuit and a motor according to the third embodiment of the present disclosure. The same descriptions are not repeated herein.

The feedback circuit 20 shown in FIG. 1 may only include an operational amplifier 52 and a first voltage divider circuit 62 as shown in FIG. 6. The first voltage divider circuit 62 may include a first resistor R3 and a second resistor R4. A first terminal of the first resistor R3 is coupled with the common voltage VCC (or the reference voltage). A second terminal of the first resistor R3 is connected to a first terminal of the second resistor R4. A second terminal of the second resistor R4 is connected to the ground GND.

If the feedback circuit 20 only includes the operational amplifier 52 and the first voltage divider circuit 62, a first input terminal of the operational amplifier 52 may be directly connected to the second node OUT2, and a second input terminal of the operational amplifier 52 may be connected to a node between the second terminal of the first resistor R3 and the first terminal of the second resistor R4. As a result, the voltage VOUT2 of the second node OUT2 is pulled up to a voltage that is equal to a voltage divided from the common voltage VCC (that is, a voltage of the second resistor R4).

If necessary, the feedback circuit 20 shown in FIG. 1 may further include a second operational amplifier 61 shown in FIG. 6. The second operational amplifier 61 may include a third resistor R1 and a fourth resistor R2. A first terminal of the third resistor R1 is connected to the second node OUT2. A second terminal of the third resistor R1 is connected to a first terminal of the fourth resistor R2. A second terminal of the fourth resistor R2 is connected to the ground GND The first input terminal of the operational amplifier 52 may be connected to the node between the second terminal of the third resistor R1 and the first terminal of the fourth resistor R2. A voltage of the node between the second terminal of the third resistor R1 and the first terminal of the fourth resistor R2 is a voltage divided from the voltage VOUT2 of the second node OUT2. The divided voltage is a voltage of the fourth resistor R2. The second input terminal of the operational amplifier 52 may be connected to the node between the second terminal of the first resistor R3 and the first terminal of the second resistor R4. A voltage of the node between the second terminal of the first resistor R3 and the first terminal of the second resistor R4 is the voltage divided from the common voltage VCC. The divided voltage is the voltage of the second resistor R4.

If a resistance of the first resistor R3 is equal to a resistance of the third resistor R1 and a resistance of the second resistor R4 is equal to a resistance of the fourth resistor R2, the voltage VOUT2 of the second node OUT2 is pulled to a voltage that is equal to the common voltage VCC by the operational amplifier 52.

Figure 7:
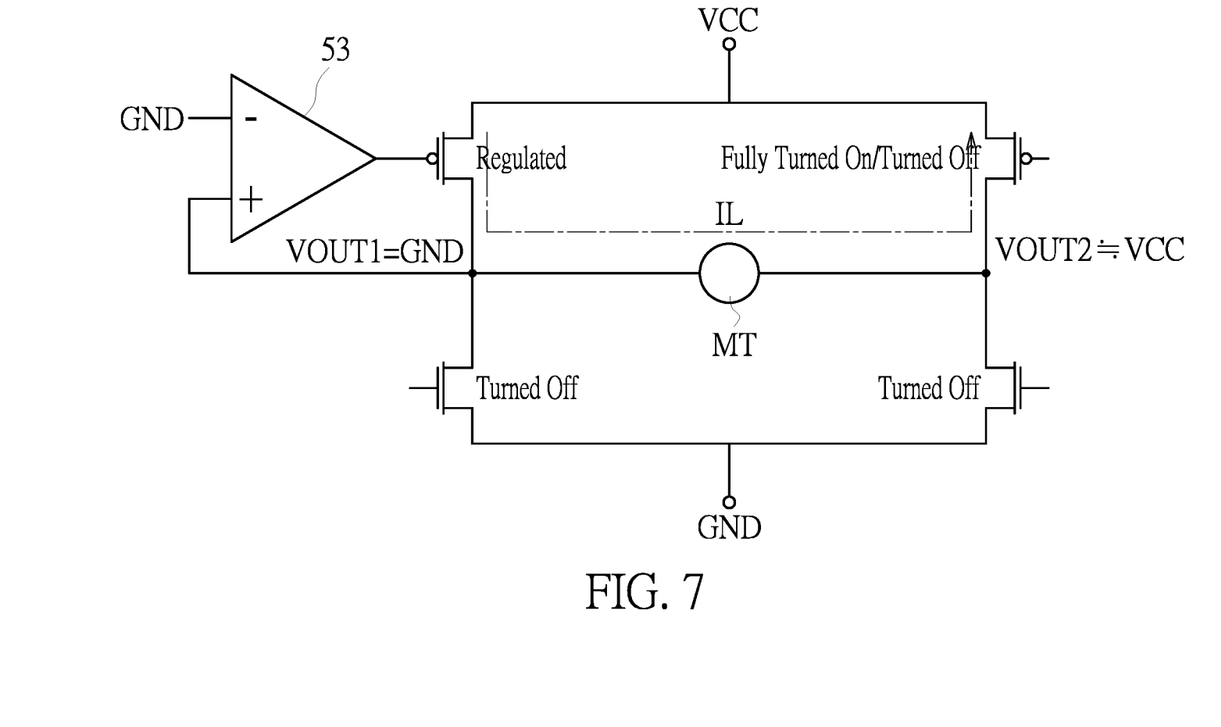
FIG. 7 is a circuit layout diagram of a bridge circuit and a feedback circuit of the motor controlling circuit and a motor according to the fourth embodiment of the present disclosure.

Reference is made to FIGS. 1 and 7, in which FIG. 7 is a circuit layout diagram of a bridge circuit and a feedback circuit of the motor controlling circuit and a motor according to the fourth embodiment of the present disclosure. The same descriptions are not repeated herein.

The feedback circuit 20 shown in FIG. 1 may include an operational amplifier 53 shown in FIG. 7. A first input terminal such as an inverting input terminal of the operational amplifier 53 may be connected to the ground GND. A second input terminal such as a non-inverting input terminal of the operational amplifier 53 may be connected to the first node OUT1. An output terminal of the operational amplifier 53 may be connected to the control terminal of the first high-side transistor H1. The second input terminal of the operational amplifier 53 receives a zero voltage such that the voltage VOUT1 of the first node OUT1 is pulled down to be equal to the zero value.

Figure 8:
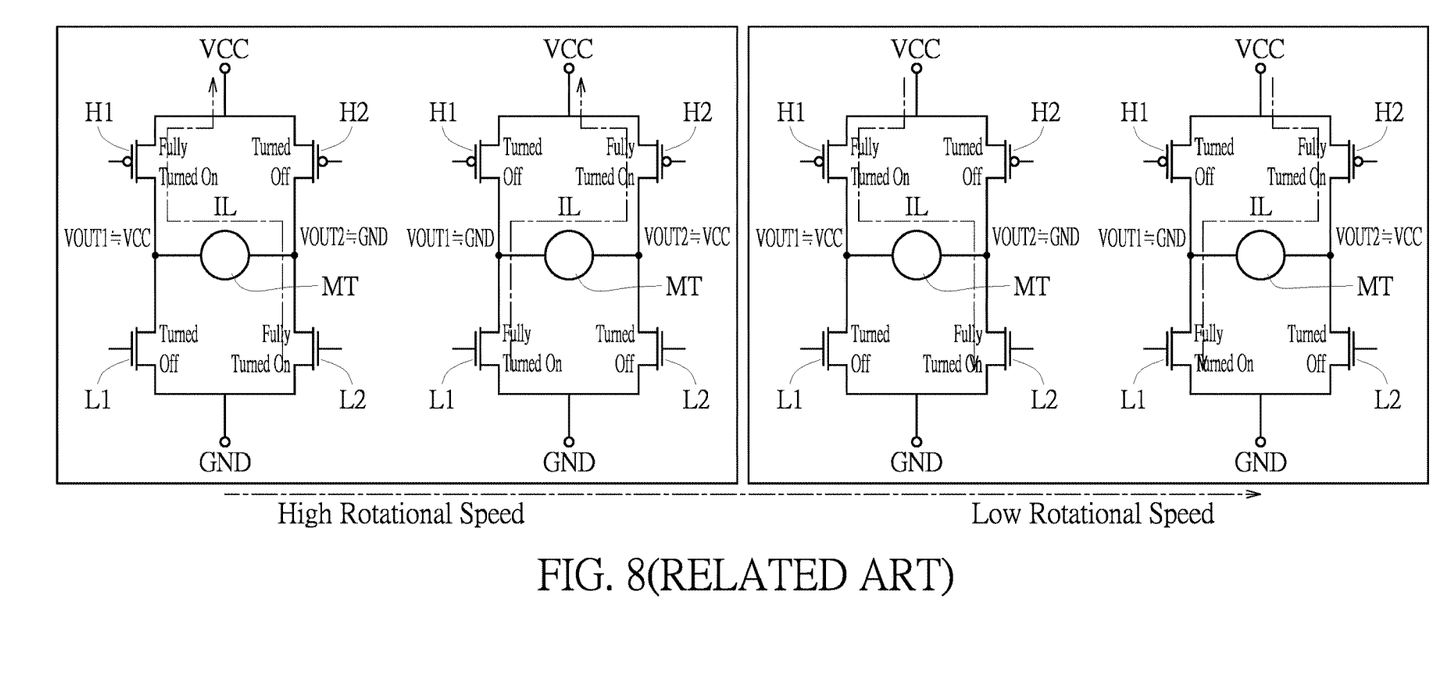
FIG. 8 is a schematic diagram of flow directions of currents of a conventional bridge circuit.
Figure 9:
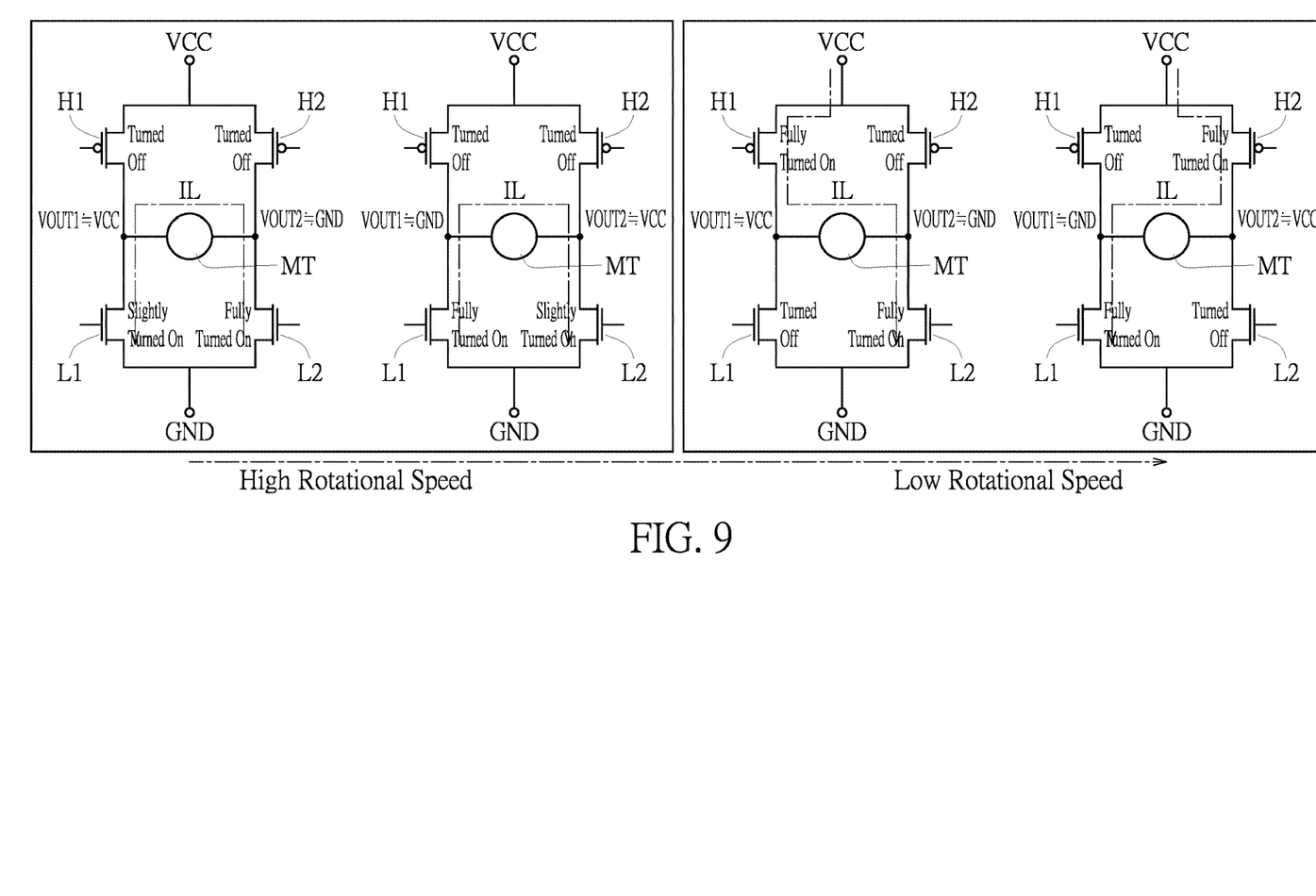
FIG. 9 is a schematic diagram of flowing directions of currents of a bridge circuit of the motor controlling circuit according to the fifth embodiment of the present disclosure.

Reference is made to FIGS. 8 and 9, in which FIG. 8 is a schematic diagram of flowing directions of currents of a conventional bridge circuit, and FIG. 9 is a schematic diagram of flowing directions of currents of a bridge circuit of the motor controlling circuit according to the fifth embodiment of the present disclosure.

For example, as shown in FIG. 8, when the motor rotates at a high frequency, the first high-side transistor H1 and the second low-side transistor L2 of a conventional bridge circuit may be fully turned on, the first low-side transistor L1 and the second high-side transistor H2 of the conventional bridge circuit may be turned off, at a same time. At this time, the current IL flows from the second low-side transistor L2 sequentially through the motor MT and the first high-side transistor H1 to the common voltage VCC.

As shown in FIG. 9, in the embodiment of the present disclosure, the first high-side transistor H1 and the second high-side transistor H2 of the bridge circuit are turned off, the first low-side transistor L1 of the bridge circuit is regulated and slightly turned on, and the second low-side transistor L2 of the bridge circuit is fully turned on, at a same time, by the driver circuit 10 shown in FIG. 1. As a result, the current IL sequentially flows through the second low-side transistor L2, the motor MT and the first low-side transistor L1 to the ground GND, thereby preventing the current IL from flowing to the common voltage VCC. The bridge circuit of the embodiment is not switched in a manner similar to that of the conventional bridge circuit until when the current IL is reduced to be smaller than the threshold, such as the zero value.

Then, as shown in FIG. 8, the first high-side transistor H1 and the second low-side transistor L2 of the conventional bridge circuit are turned off, and the first low-side transistor L1 and the second high-side transistor H2 of the conventional bridge circuit are fully turned on. At this time, the current IL flows from the first low-side transistor L1 sequentially through the motor MT and the second high-side transistor H2 to the common voltage VCC.

As shown in FIG. 9, in the embodiment of the present disclosure, the first high-side transistor H1 and the second high-side transistor H2 are turned off, the first low-side transistor L1 is fully turned on, and the second low-side transistor L2 is regulated and slightly turned on, at a same time, by the driver circuit 10 shown in FIG. 1. As a result, the current IL sequentially flows through the first low-side transistor L1, the motor MT and the second low-side transistor L2 to the ground GND, thereby preventing the current IL from flowing to the common voltage VCC. The bridge circuit of the embodiment is not switched as the above descriptions of the conventional bridge circuit until when the current IL is reduced to be smaller than the threshold such as the zero value.

That is, the motor controlling circuit of the present disclosure can perform the above-mentioned protection operation, regardless of whether the motor commutates (or the motor rotates unexpectedly). As a result, the current can be prevented from flowing to the common voltage, for example, when energy of back electromotive force that changes with a rotational speed of a fan is higher than the common voltage.

Figure 10:
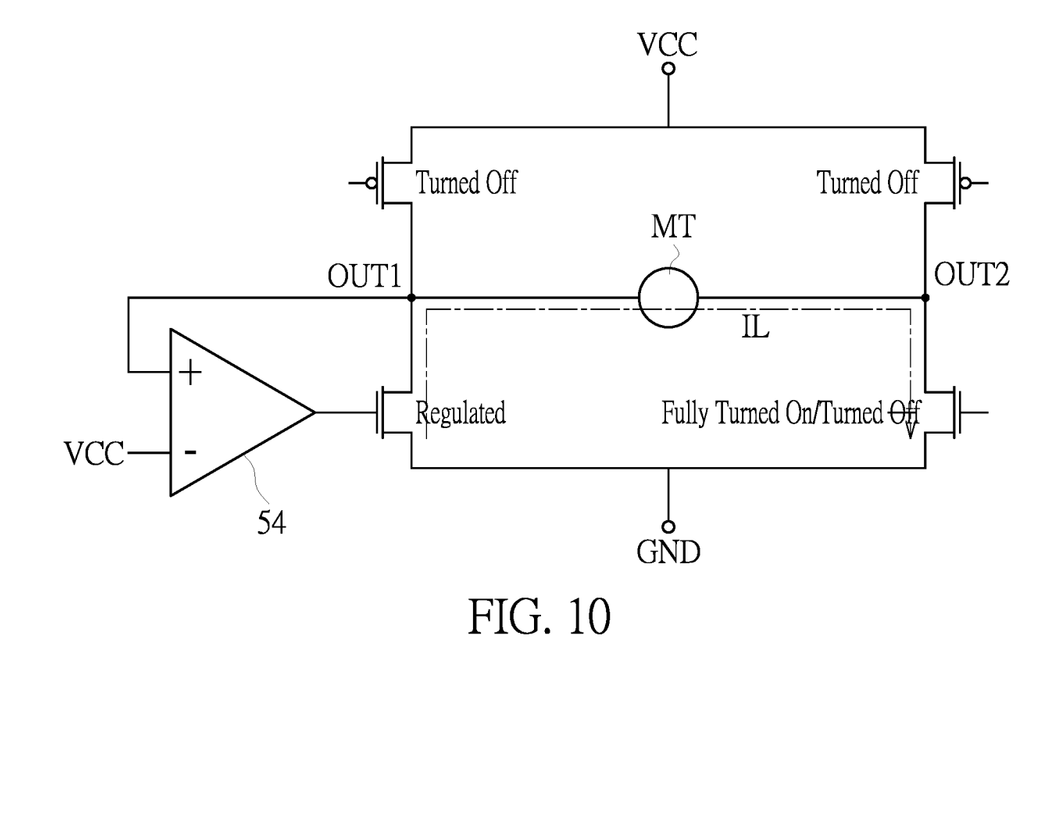
FIG. 10 is a circuit layout diagram of a bridge circuit and a feedback circuit of the motor controlling circuit and a motor according to the sixth embodiment of the present disclosure.

Reference is made to FIGS. 1 and 10, in which FIG. 10 is a circuit layout diagram of a bridge circuit and a feedback circuit of the motor controlling circuit and a motor according to the sixth embodiment of the present disclosure.

The feedback circuit 20 shown in FIG. 1 may include an operational amplifier 54 shown in FIG. 10. A first input terminal of the operational amplifier 54 may be connected to the first node OUT1 and obtain the voltage of the first node OUT1. A second input terminal of the operational amplifier 54 may be coupled to the common voltage VCC (or the reference voltage). An output terminal of the operational amplifier 54 may be connected to the control terminal of the first low-side transistor L1. As a result, the voltage of the first node OUT1 is pulled to a voltage that is equal to the common voltage VCC (or the reference voltage) by the operational amplifier 54.

Figure 11:
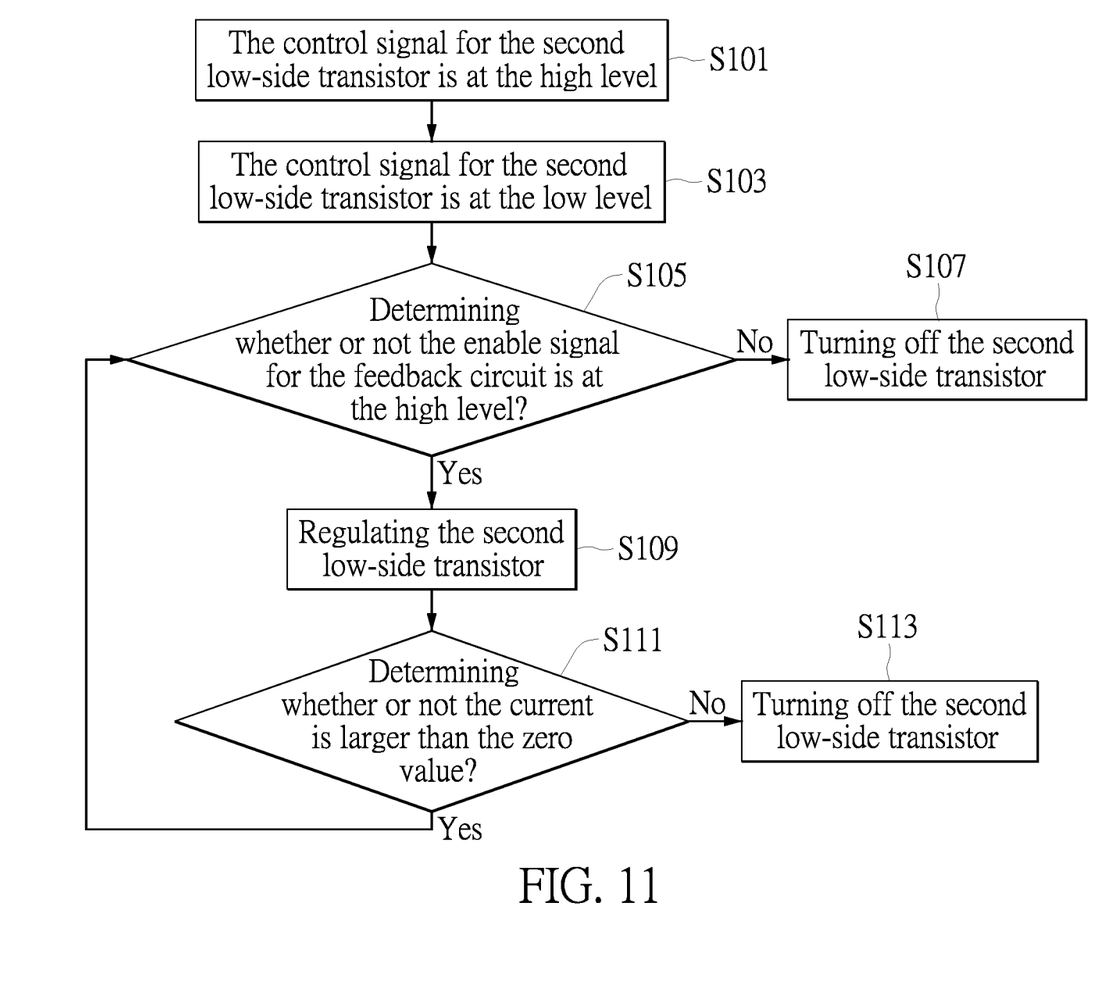
FIG. 11 is a flowchart diagram of a motor controlling method according to the seventh embodiment of the present disclosure.

Reference is made to FIG. 11, which is a flowchart diagram of a motor controlling method according to the seventh embodiment of the present disclosure.

In the embodiment, the motor controlling method may include steps S101 to S113 shown in FIG. 11. The steps S101 to S113 are applicable to the motor controlling circuit shown in FIG. 1.

In step S101, the controller circuit 30 outputs the control signal at a high level to the driver circuit 10. The driver circuit 10 turns on the second low-side transistor L2 according to the control signal at the high level.

In step S103, the controller circuit 30 outputs the control signal at a low level to the driver circuit 10.

In step S105, the feedback circuit 20 determines whether or not the enable signal that is outputted to the feedback circuit 20 by the controller circuit 30 is at a high level. If the enable signal that is outputted to the feedback circuit 20 by the controller circuit 30 is not at the high level, step S107 is performed. Conversely, if the enable signal that is outputted to the feedback circuit 20 by the controller circuit 30 is at the high level, step S109 is performed.

In step S107, the feedback circuit 20 instructs the driver circuit 10 to turn off the second low-side transistor L2 according to the control signal at the low level that is outputted by the controller circuit 30.

In step S109, the feedback circuit 20 instructs the driver circuit 10 to regulate and fully turn on the second low-side transistor L2 to adjust the voltage of the second node OUT2. For example, the voltage of the second node OUT2 is adjusted to approach or be equal to the common voltage VCC, or is equal to (K times) the reference voltage (wherein K is a suitable value).

In step S111, the feedback circuit 20 determines whether or not the current IL flowing through the motor MT is larger than the zero value (for example, according to the voltage of the first node OUT1 and/or the voltage of the second node OUT2). If the current IL flowing through the motor MT is larger than the zero value, step S109 is performed again. If the current IL flowing through the motor MT is not larger than the zero value, step S113 is performed.

In step S113, the feedback circuit 20 instructs the driver circuit 10 to turn off the second low-side transistor L2 according to the control signal at the low level that is outputted by the controller circuit 30.

Figure 12:
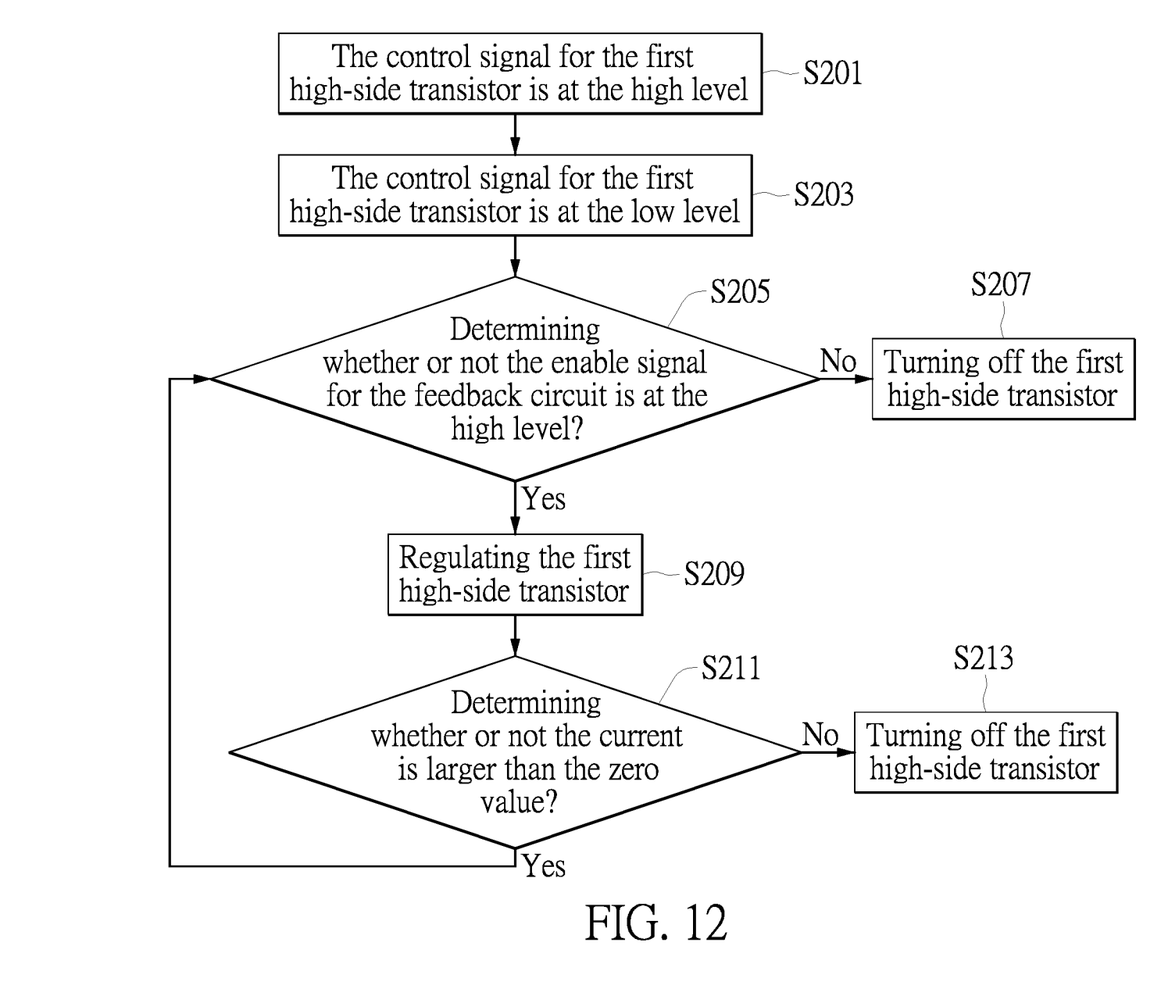
FIG. 12 is a flowchart diagram of a motor controlling method according to the eighth embodiment of the present disclosure.

Reference is made to FIG. 12, which is a flowchart diagram of a motor controlling method according to the eighth embodiment of the present disclosure.

In the embodiment, the motor controlling method may include steps S201 to S213 shown in FIG. 11. The steps S201 to S213 are applicable to the motor controlling circuit shown in FIG. 1.

In step S201, the controller circuit 30 outputs the control signal at a high level to the driver circuit 10. The driver circuit 10 turns on the first high-side transistor H1 according to the control signal at the high level.

In step S203, the controller circuit 30 outputs the control signal at a low level to the driver circuit 10.

In step S205, the feedback circuit 20 determines whether or not the enable signal that is outputted to the feedback circuit 20 by the controller circuit 30 is at a high level. If the enable signal that is outputted to the feedback circuit 20 by the controller circuit 30 is not at the high level, step S207 is performed. Conversely, if the enable signal that is outputted to the feedback circuit 20 by the controller circuit 30 is at the high level, step S209 is performed.

In step S207, the feedback circuit 20 instructs the driver circuit 10 to turn off the first high-side transistor H1 according to the control signal at the low level that is outputted by the controller circuit 30.

In step S209, the feedback circuit 20 instructs the driver circuit 10 to regulate and slightly turn on the first high-side transistor H1 to adjust the voltage of the first node OUT1. For example, the voltage of the first node OUT1 is adjusted to approach or be equal to the zero value.

In step S211, the feedback circuit 20 determines whether or not the current IL flowing through the motor MT is larger than the zero value (for example, according to the voltage of the first node OUT1 and/or the voltage of the first node OUT1). If the current IL flowing through the motor MT is larger than the zero value, step S209 is performed again. If the current IL flowing through the motor MT is not larger than the zero value, step S213 is performed.

In step S213, the feedback circuit 20 instructs the driver circuit 10 to turn off the first high-side transistor H1 according to the control signal at the low level that is outputted by the controller circuit 30.

In summary, the present disclosure provides the motor controlling circuit. Before the bridge circuit is switched, the first high-side transistor and the second high-side transistor are turned off, the first low-side transistor is fully or slightly turned on, and the second low-side transistor is fully or slightly turned on. Under this condition, the voltage of the first node between the first terminal of the first low-side transistor and the second terminal of the first high-side transistor can be regulated to a first target voltage. Alternatively, the voltage of the second node between the first terminal of the second low-side transistor and the second terminal of the second high-side transistor can be regulated to a second target voltage. As a result, the current flows to the ground through the first low-side transistor and the second low-side transistor. Then, when the bridge circuit is switched, the current does not flow to and does not charge the common voltage to reach an excessive voltage. Therefore, the transistors can be prevented from being damaged by the excessive voltage.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor controlling circuit, which is applicable to a motor, comprising:
a bridge circuit including a plurality of transistors, wherein the plurality of transistors includes:
a first high-side transistor, wherein a first terminal of the first high-side transistor is coupled to a common voltage;
a first low-side transistor, wherein a first terminal of the first low-side transistor is connected to a second terminal of the first high-side transistor, a second terminal of the first low-side transistor is grounded, and a first node between the first terminal of the first low-side transistor and the second terminal of the first high-side transistor is connected to a first terminal of the motor;
a second high-side transistor, wherein a first terminal of the second high-side transistor is coupled to the common voltage; and
a second low-side transistor, wherein a first terminal of the second low-side transistor is connected to a second terminal of the second high-side transistor, a second terminal of the second low-side transistor is grounded, and a second node between the first terminal of the second low-side transistor and the second terminal of the second high-side transistor is connected to a second terminal of the motor;
a driver circuit connected to a control terminal of each of the plurality of transistors and configured to turn on or off each of the plurality of transistors;
a controller circuit connected to the driver circuit and configured to control the driver circuit; and
a feedback circuit including an operational amplifier, wherein a first input terminal of the operational amplifier is connected to the second node between the first terminal of the second low-side transistor and the second terminal of the second high-side transistor, a second input terminal of the operational amplifier is coupled to the common voltage, and an output terminal of the operational amplifier is connected to the control terminal of the second low-side transistor.

2. The motor controlling circuit according to claim 1, wherein the driver circuit, according to a control signal from the controller circuit and the feedback signal, turns off the first high-side transistor and the second high-side transistor, fully or slightly turns on the first low-side transistor, and fully or slightly turns on the second low-side transistor, at a same time, such that the current flows through the first low-side transistor and the second low-side transistor.

3. The motor controlling circuit according to claim 1, wherein the driver circuit, according to a control signal from the controller circuit and the feedback signal, turns off the first low-side transistor and the second low-side transistor, fully or slightly turns on the first high-side transistor, and fully or slightly turns on the second high-side transistor, at a same time, such that the current flows through the first high-side transistor and the second high-side transistor.

4. The motor controlling circuit according to claim 1, wherein the driver circuit, according to a control signal from the controller circuit and the feedback signal, regulates the bridge circuit to adjust the voltage of the second node to approach or be equal to the common voltage and to adjust the voltage of the first node to approach or be equal to a zero value, or regulates the bridge circuit to adjust the voltage of the first node to approach or be equal to the common voltage and to adjust the voltage of the second node to approach or be equal to the zero value.

5. The motor controlling circuit according to claim 1, further comprising:
- a rotor position detector circuit connected to the controller circuit and configured to detect a position of a rotor of the motor, wherein the controller circuit controls the driver circuit based on the position of the rotor of the motor.

* * * * *